United States Patent Office 3,397,152
Patented Aug. 13, 1968

3,397,152
CORROSION INHIBITOR COMPOSITION
AND PROCESS
Louise H. Brown, Santa Monica, and Ronald Swidler,
Pasadena, Calif., assignors, by mesne assignments, to
Armour and Company, Chicago, Ill., a corporation of
Delaware
No Drawing. Continuation-in-part of application Ser. No.
111,495, May 22, 1961. This application Oct. 23, 1965,
Ser. No. 504,216
23 Claims. (Cl. 252—390)

This application is a continuation-in-part of Brown et al. application, Ser. No. 111,495 filed May 22, 1961 and now abandoned.

This invention relates to the preparation of corrosion inhibitors and has particular reference to corrosion inhibitor compositions useful in connection with the protection of ferrous metals against corrosion.

A primary object of the present invention is to provide a novel class of organic amines useful, inter alia, as corrosion inhibitors or as components of corrosion inhibitor compositions.

A further object of the present invention is to provide novel corrosion inhibitor compounds or compositions constituting or containing aryl stearyl amines.

A further object of the present invention is to provide a novel process for producing amine-type corrosion inhibitors.

Other objects and advantages of this invention it is believed will be readily apparent from the following detailed description of preferred embodiments thereof.

Briefly, this invention comprehends within its scope the discovery of the preparation of aryl stearic amines, and the further discovery that such compounds constitute novel and improved corrosion inhibitors for ferrous metals. The aryl stearic amines used in the present invention are prepared by first converting an aryl stearic acid (preferably prepared by alkylating an aromatic compound with oleic acid or a derivative thereof in the presence of an acid-activated clay catalyst) to the chloride, then converting the aryl stearyl chloride to the amide, then converting the amide to the nitrile which in turn is converted to the amine.

The amines of this invention which have been found especially effective in corrosion inhibiting compositions may be produced by first alkylating aryl compounds with unsaturated fatty acids and then converting the acid to an amine and can be represented by the following formula:

$$CH_3(CH_2)_x-CH-(CH_2)_y-CH_2NH_2$$
$$|$$
$$R$$

where:
R is an aryl radical
X is an integer from 0 to 20
Y is an integer from 1 to 21
The sum of X and Y is from 7 to 21

Preferably Y is greater than 3 and the sum of X and Y is 15.

The aryl radical may contain one or more phenyl groups, e.g., the radical may be derived by alkylating with an unsaturated fatty acid. Aryl compounds within the scope of this invention are benzene, naphthalene, and anthracene. The aryl radical may be substituted with lower alkyl groups such as methyl, ethyl, propyl, butyl, pentyl and hexyl. In addition, the aryl radical may be substituted with other nondeleterious substituents such as hydroxyl groups and halides such as chloride, etc. Examples of suitable substituted aryl groups are anisole, phenol, cresol, chlorobenzene, and naphthol.

The unsaturated fatty acids which are suitable in preparing the corrosion inhibitor component of this composition include those unsaturated fatty acids having from about 10 to about 24 carbon atoms, the preferred acids for corrosion inhibition containing 14 to 18 carbon atoms. The fatty acid may contain one or more double bonds, although those containing one double bond are preferred in preparing the corrosion inhibitor. Examples of fatty acids which may be used in this invention are undecylenic, oleic, palmitoleic, petroselenic, eurcic, and linoleic.

The aryl groups are normally present on carbon atoms which are at least six carbons away from the carboxyl or amine group, being introduced in the vicinity of the double bond. See Smith et al., Journal of Organic Chemistry, March 1965, page 885. Although the exact point at which the aryl group is attached will vary with reaction conditions and the exact nature of the aryl compound and unsaturated fatty acid used, essentially no substitution occurs on the 2-carbon atom and carbon atoms adjacent thereto. In the case of oleic acid, no substitution occurs until the 6-carbon atom. Because of the predominance of aryl substitution at the carbon atoms adjacent to the double bond, the 9 and 10 carbon atoms in oleic acid, the aryl substituted oleic acids are commonly referred to as C9-10 aryl oleic acids and the amines derived therefrom are described as C9-10 amines.

The following specific examples are illustrative of the compositions and process of the present invention, but it is to be understood that the invention is not to be limited to the specific details thereof. The oleic acid used in the examples contained small amounts of $C_{14}$ and $C_{16}$ unsaturated acid.

Example 1.—Naphthyl stearyl amine

Oleic acid (169 g., 0.6 mole), naphthalene (308 g., 2.4 mole) and "Filtrol" GR 58 were heated and stirred at 200° for 7 hours. The reaction mixture was cooled, diluted with chloroform and the clay removed by filtration. The filtrate was collected and the solvent removed. The resultant reaction mixture was submitted to vacuum distillation to yield the following fractions:

| Fraction | B.P. | Wt. (g.) | n | Neutral Equivalent |
|---|---|---|---|---|
| 1 | 122–129 | 218 | | (¹) |
| 2 | 124–196/1 mm | 7 | Solid | 304 |
| 3 | 165–248/.2 | 10.5 | | 386 |
| 4 | 248–275/0.5 | 116 | $n^{23}$ 1.5317 | 390 |
| 5 | Residue | 60 | 1.5318 | 576 |

¹ Naphthalene.

A 102 g. (0.25 mole) portion of fraction 4, 9, [10]-naphthalene-stearic acid, was heated at reflux for 1.5 hours with 60 g. (0.5 mole) thionyl chloride. The excess thionyl chloride was removed in vacuo at the aspirator and the residual oil dissolved in an equal volume of ether. This ethereal solution was added over a two-hour period to 200 ml. of cold concentrated ammonia maintaining vigorous agitation. Enough ether was added to keep the mixture fluid. Upon completion of the addition saturated aqueous sodium chloride was added to break the emulsion. The ethereal layer was separated and washed with dilute hydrochloric acid, 10% sodium bicarbonate, water and finally saturated sodium chloride. The ethereal extract was dried over magnesium sulfate, filtered and the ether evaporated leaving 99 g. of the brown oily amide.

The above amide (89 g.) was dissolved in 150 ml. of benzene and 70 g. of phosphorous pentoxide was added. The mixture was stirred and heated at reflux for 15 hours. The mixture was poured into ice water. The organic layer was separated and the water layer extracted with ether. The organic extracts were combined and washed repeatedly with water until neutral. After drying over magnesium sulfate the solvent and solid were removed leaving 81 g. of a brown oil which was submited to vacuum distillation. Listed are the boiling points, weights and refractive indexes at 22° C.: (1) 147–198°, 2.5 g.; (2) 198–226°, 2.19, 1.4945; (3) 226–239°, 49.5 g., 1.5294; (4) 239–253°, 13.5 g., 1.5287; (5) 8.0 g. residue.

Fractions 3 and 4 (63 g.), naphthylstearonitrile, were combined and dissolved in 50 ml. of absolute ethanol. The solution was added slowly to a suspension of 28 g. of sodium in 100 ml. of boiling toluene while maintaining rapid stirring. After complete addition of the nitrile had been effected 50 ml. of ethanol was added and then 10 ml. of water. The layers were separated and the aqueous alcoholic phase extracted with benzene. The benzene and the solvents removed leaving 50 g. of residual oil which was submitted to vacuum distillation at 0.5 mm. Listed are the boiling point, weight and refractive index of the fractions: (1) 175–215°, 1.0 g., 1.5017; (2) 215–240°, 36 g., 1.5108; (3) 7.0 g. residue. Fraction 2 had a neutral equivalent of 466 whereas theory for naphthylstearyl amine is 391. The infrared spectrum of this material showed the presence of amide contaminants.

Fraction 2 was dissolved in 50 ml. of absolute ethanol and a solution of 5.6 g. (0.044 mole) of oxalic and dissolved in a minimum amount of ethanol was added. A white crystalline precipitate formed immediately. The solid was collected, after chilling the mixture to 0°, and washed with cold acetone. The oxalate was slurried with 10% sodium hydroxide overnight. The oil which appeared was extracted with ether. The ethereal layer was washed repeatedly with water and saturated aqueous sodium chloride. The ethereal extract was dried over magnesium sulfate, filtered and the ether evaporated. The residual oil was distilled at 0.8 mm. Yield 21 g. of naphthylstearyl amino (B.P. 220–227; $n^{20}$ 1.5122; neutral equivalent, 410).

Example 2.—Phenyl stearyl amine

Phenylstearic acid (50 g., obtained from the Barlow Chemical Co.) and thionyl chloride (33 g.) were refluxed on the steam bath for 3 hours. Excess thionyl chloride was removed at aspirator pressure, and the residual liquid was dissolved in an equal volume of ether and added to chilled 28% aqueous ammonia (100 ml.) with vigorous stirring. During the addition (0.75 hr.) portions (50 ml.) of ether were added at intervals to keep the mixture fluid.

After addition was complete, the mixture was stirred ½ hr. and the layers separated. The organic layer was washed with water, dilute hydrochloric acid, and salt solution until the washings were neutral. The extract was then dried over magnesium sulfate, filtered from the drying agent, and the solvent removed to give 40 g. of a brown waxy low-melting solid. The amide (40 g.) was dissolved in benzene (100 ml.), phosphorous pentoxide (30 g.) was added and the mixture refluxed for 18 hours. The mixture was extracted with ether, washed with water, dilute sodium bicarbonate, salt solution, and dried over magnesium sulfate. The solvent was evaporated, leaving 37 g. of a dark brown oil. The oil was distilled in vacuo, B.P. 140–190° −0.05 mm. to yield 31 g. of a dark brown oil which was redistilled into 3 fractions: (1) B.P. 20–178/0.06 m. (2 gm.) $n^{25}$ 1.4881; (2) B.P. 178–190°/0.06 m. (26 gm.) $n^{25}$ 1.4870; (3) B.P. 190–195°/0.06 mm. (2 gm.) $n^{25}$ 1.4880.

The nitrile (cut 2, 20 gm.) was dissolved in absolute ethanol (30 ml.) and added slowly to sodium metal (9 gm.) in refluxing toluene (35 ml.). The mixture became viscous and more toluene was added. After addition was complete, ethanol was added, followed by water. The mixture was poured into water and extracted with ether. The ether extract was washed, dried and distilled in vacuo into 3 fractions: (1) B.P. 20–173°/0.13 mm. (2 gm.); (2) 173–187°/0.13 mm. (14 gm.); (3) 187–190°/0.13 mm. (1 g.). Neutral equivalent of cut 2, 405. The amine was purified via its oxalate salt (Example 1), and on distillation had B.P. 165–170°/0.1 mm., $n^{28}$ 1.4872, neutral equivalent 384.

Example 3.—Anisole stearyl amine

Anisole (162 g., 1.5 mole), methyl oleate (85 g., 0.3 mole) and "Filtrol" GR 13 (30 g.) were heated at reflux for 4 hours. The mixture was filtered and the clay washed with benzene and acetone. The solvent and anisole were removed in vacuo and the residual oil submitted to vacuum distillation at 0.1 mm. to yield (i) 10 g., 100–175°, $n^{34}$ 1.4633 and (ii) 69 g., 180–200°, $n^{24}$ 1.4878. Fraction (ii) was methyl 9, [10] anisylstearate, 50 g. of which was submitted to saponification with alcoholic potassium hydroxide. The free acid was liberated, extracted with ether, and recovered.

The recovered acid was heated on the steam bath for three hours with thionyl chloride (35 g.), dissolved in an equal volume of ether, and added to excess cold concentrated aqueous ammonia. The organic layer was washed, dried, and the solvent removed. The residue was dissolved in an equal volume of benzene, and phosphorous pentoxide (30 g.) was added in 3 gm. portions over a period of four hours. The mixture was refluxed 15 hours, water was added to decompose excess $P_9O_5$, the organic layer washed and dried. The solvent was removed and the residue distilled in vacuo to give 30 g. of a yellow viscous oil, B.P. 180–220°/0.2 mm. This oil was redistilled in vacuo. The fraction (22 g.) having B.P. 185–202°/0.1 mm., $n^{25}$ 1.4920 was 9, [10]-anisylstearonitrile.

Reduction to the amine was accomplished by dissolving the nitrile (16 gm.) in absolute ethanol (10 g.) and adding slowly to a mixture of metallic sodium (3.7 g.) in refluxing toluene (35 ml.). After addition, 16 ml. absolute ethanol was added, followed by 10 ml. water. Upon cooling the organic layer was separated, washed, dried, and solvent removed to yield 16 gm. of residual yellow-red oil. The amine was purified via its oxalate salt as in Example 1, (B.P. 165–180°/0.06 mm., $n^{25}$ 1.4922, neutral equivalent 394, theoretical 376).

Example 4.—Tolyl stearyl amine

The tolylstearic acid used in this example was prepared as follows: Toluene (138 g., 1.5 mole), oleic acid (84.6 g., 0.3 mole), and "Filtrol" GR 58 (10 g.) were placed in a bomb cup. The bomb was assembled and flushed with nitrogen, then heated at 188–200° C. for 2 hours. At the end of this time the bomb was cooled, and the material was filtered. The filter cake was washed with benzene. The filtrate and washings were combined and evaporated at aspirator pressure. The residual oil was distilled in vacuo giving five fractions. Listed are boiling point, weight, and refractive index: (1) 59–161° C./0.7 mm., 2.3 g., $n^{24}$ 1.4725; (2) 161–198° C./0.7 mm., 29.2 g.; (3) 195–220° C./0.5 mm., 5.4 g.; (4) 220–235° C./0.5 mm., 37.2 g., $n^{24}$ 1.4913; and (5) residue, 19.6 g., $n^{24}$ 1.4965. Fraction (4) was 9,[10]-p-tolylstearic acid. Neutral equivalent calculated: 374.5. Found: 368. The yield was 34.7% based on oleic acid.

Tolylstearyl amine was prepared as follows: 9,[10]-tolyl-stearic acid (20 g.) was heated with thionyl chloride (14 g.) on the steam bath for about 4 hours. Excess thionyl chloride was removed with an aspirator, the residue was dissolved in an equal volume of ether and added to chilled 28% aqueous ammonia (50 ml.). The organic layer was separated, washed, dried, and the solvent removed to yield 19 g. of a dark brown oil. This oil was then treated similarly to the other examples; viz, with phosphorous pentoxide, followed by reduction of the crude nitrile to yield 15 gm. of crude amine. The amine, when purified through the oxalate salt and distilled in vacuo (B.P. 155–170° C./0.06 mm., $n^{28}$ 1.4878, neutral equivalent 381).

The aryl stearyl amines of the present invention are useful as corrosion inhibitors for ferrous metals, such as for example when added in small amounts (preferably 25 or 50 parts per million, generally less than 1% by volume) to fuel oil, drilling mud compositions and the like, or when used as a metal coating. Thus, the compounds were each evaluated in a standard humidity cabinet test. In carrying out this test, 25 and 50 p.p.m. solutions of each aryl amine in methylene chloride were prepared. Steel test panels were cleaned and weighed, dipped into the solutions and slowly removed, allowing the solvent to evaporate and the compound to form a protective coating. The coated panels were then held in the humidity cabinet for 5 days under conditions of 105° F., 100% relative humidity. Under the test conditions, the naphthyl stearyl amine exhibited a clear superiority to several commercially available amine-type inhibitors, and the other aryl stearyl amines were of almost equal effectiveness as compared to the best commercially available material.

Having fully described our invention, it is to be understood that we do not wish to be limited to the details set forth, but our invention is of the full scope of the appended claims.

We claim:
1. A process for inhibiting corrosion comprising applying to a corrodible surface a corrosion inhibitor composition consisting essentially of an effective corrosion inhibiting amount of an amine having the formula

$$CH_3(CH_2)_x-\underset{\underset{R}{|}}{CH}-(CH_2)_y-CH_2NH_2$$

wherein R is an aryl radical, X is an integer from 0 to 20, Y is an integer from 1 to 21, and X and Y is from 7 to 21.

2. A process for inhibiting corrosion comprising applying to a corrodible surface a corrosion inhibitor composition consisting essentially of an effective corrosion inhibiting amount of an amine having the formula:

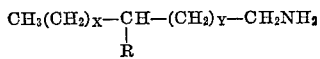

wherein X and Y are integers, Y is greater than 3, X and Y is 15, and R is naphthyl and a solvent therefor.

3. A process for inhibiting corrosion comprising applying to a corrodible surface a corrosion inhibitor composition consisting essentially of an effective corrosion inhibiting amount of an amine having the formula:

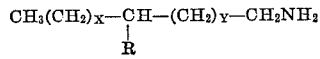

wherein X and Y are integers, Y is greater than 3, X and Y is 15, and R is phenyl and a solvent therefor.

4. A process for inhibiting corrosion comprising applying to a corrodible surface a corrosion inhibitor composition consisting essentially of an effective corrosion inhibiting amount of an amine having the formula:

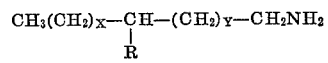

wherein X and Y are integers, Y is greater than 3, X and Y is 15, and R is anisole and a solvent therefor.

5. A process for inhibiting corrosion comprising applying to a corrodible surface a corrosion inhibitor composition consisting essentially of an effective corrosion inhibiting amount of an amine having the formula:

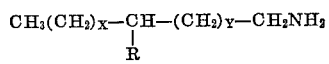

wherein X and Y are integers, Y is greater than 3, X and Y is 15, and R is tolyl and a solvent therefor.

6. A corrosion inhibitor composition consisting essentially of an effective corrosion inhibiting amount of an amine having the formula:

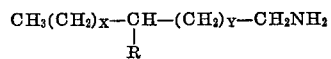

wherein R is an aryl radical, X is an integer from 0 to 20, Y is an integer from 1 to 21, and X and Y is from 7 to 21.

7. A corrosion inhibitor composition consisting essentially of an effective corrosion inhibiting amount of an amine having the formula:

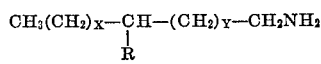

wherein X and Y are integers Y is greater than 3, X and Y is 15, and R is naphthyl and a solvent therefor.

8. A corrosion inhibitor composition consisting essentially of an effective corrosion inhibiting amount of an amine having the formula:

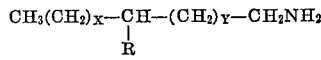

wherein X and Y are integers, Y is greater than 3, X and Y is 15, and R is phenyl and a solvent therefor.

9. A corrosion inhibitor composition consisting essentially of an effective corrosion inhibiting amount of an amine having the formula:

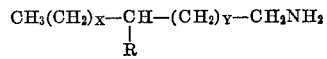

wherein X and Y are integers, Y is greater than 3, X and Y is 15, and R is anisole and a solvent therefor.

10. A corrosion inhibitor composition consisting essentially of an effective corrosion inhibiting amount of an amine having the formula:

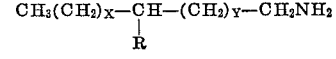

wherein X and Y are integers, Y is greater than 3, X and Y is 15, and R is tolyl and a solvent therefor.

11. A corrosion inhibited article comprising a substrate having a corrodible surface coated with a corrosion inhibitor composition consisting essentially of an effective corrosion inhibitor amount of an amine having the formula:

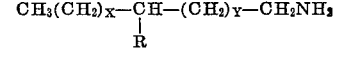

wherein R is an aryl radical, X is an integer from 0 to 20, Y is an integer from 1 to 21, and X and Y is from 7 to 21.

12. A corrosion inhibited article comprising a substrate having a corrodible surface coated with a corrosion inhibitor composition consisting essentally of an effective corrosion inhibiting amount of an amine having the formula:

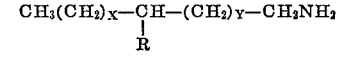

wherein X and Y are integers, Y is greater than 3, X and Y is 15, and R is naphthyl.

13. A corrosion inhibited article comprising a substrate having a corrodible surface coated with a corrosion inhibitor composition consisting essentially of an effective corrosion inhibiting amount of an amine having the formula:

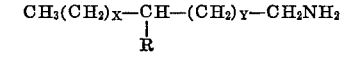

wherein X and Y are integers, Y is greater than 3, X and Y is 15, and R phenyl.

14. A corrosion inhibited article comprising a substrate having a corrodible surface coated with a corrosion inhibitor composition consisting essentially of an effective corrosion inhibiting amount of an amine having the $$CH_3(CH_2)_x-\underset{R}{C}H-(CH_2)_y-CH_2NH_2$$

wherein X and Y are integers, Y is greater than 3, X and Y is 15, and R is anisole.

15. A corrosion inhibited article comprising a substrate having a corrodible surface coated with a corrosion inhibitor composition consisting essentially of an effective corrosion inhibiting amount of an amine having the formula:

$$CH_3(CH_2)_x-\underset{R}{C}H-(CH_2)_y-CH_2NH_2$$

wherein X and Y are integers, Y is greater than 3, X and Y is 15, and R is tolyl.

16. The process of claim 1 wherein the sum of X and Y is from 11 to 15.

17. The process of claim 16 wherein R is phenyl.

18. The composition of claim 6 wherein the sum of X and Y is from 11 to 15.

19. The composition of claim 18 wherein R is phenyl.

20. The article of claim 11 wherein the sum of X and Y is from 11 to 15.

21. A process for inhibiting corrosion comprising applying to a ferrous surface a corrosion inhibitor composition consisting essentially of at least about 25 parts per million of an amine having the formula:

$$CH_3(CH_2)_x-\underset{R}{C}H-(CH_2)_y-CH_2NH_2$$

wherein:
R is an aryl radical selected from the group consisting of phenyl, naphthyl, anisole and tolyl, X and Y are integers, Y is greater than 3, the sum of X and Y is 15 and a solvent therefor.

22. A corrosion inhibitor composition consisting essentially of at least about 25 parts per million of an amine having the formula:

$$CH_3(CH_2)_x-\underset{R}{C}H-(CH_2)_y-CH_2NH_2$$

wherein:
R is an aryl radical selected from the group consisting of phenyl, naphthyl, anisole and tolyl, X and Y are integers. Y is greater than 3, the sum of X and Y is 15 and a solvent therefor.

23. A corrosion inhibited article consisting essentially of a substrate having a ferrous surface coated with an amine having the formula:

$$CH_3(CH_2)_x-\underset{R}{C}H-(CH_2)_y-CH_2NH_2$$

wherein:
R is an aryl radical selected from the group consisting of phenyl, naphthyl, anisole and tolyl, X and Y are integers, Y is greater than 3, the sum of X and Y is 15 and a solvent therefor.

References Cited
UNITED STATES PATENTS

| | | | |
|---|---|---|---|
| 2,441,518 | 5/1948 | Suter et al. | 260—570.8 |
| 2,712,531 | 7/1955 | Maguire | 252—390 X |
| 2,758,086 | 8/1956 | Stuart | 252—390 X |

FOREIGN PATENTS 851,137  10/1960  Great Britain.

MAYER WEINBLATT, *Primary Examiner.*